United States Patent
Grossauer

(10) Patent No.: US 11,794,269 B2
(45) Date of Patent: Oct. 24, 2023

(54) PAIR OF TWO NOZZLE ASSEMBLY RECEPTACLES FOR A DUAL-WIRE WELDING TORCH AND DUAL-WIRE WELDING TORCH HAVING SUCH A PAIR OF TWO NOZZLE ASSEMBLY RECEPTACLES

(71) Applicant: Fronius International GmbH, Pettenbach (AT)

(72) Inventor: Wolfgang Grossauer, Pettenbach (AT)

(73) Assignee: Fronius International GmbH, Pettenbach (AT)

( * ) Notice: Subject to any disclaimer, the term of this patent is extended or adjusted under 35 U.S.C. 154(b) by 436 days.

(21) Appl. No.: 17/268,149

(22) PCT Filed: Aug. 12, 2019

(86) PCT No.: PCT/EP2019/071545
§ 371 (c)(1),
(2) Date: Feb. 12, 2021

(87) PCT Pub. No.: WO2020/035435
PCT Pub. Date: Feb. 20, 2020

(65) Prior Publication Data
US 2021/0339332 A1   Nov. 4, 2021

(30) Foreign Application Priority Data
Aug. 13, 2018  (EP) .................... 18188660

(51) Int. Cl.
*B23K 9/29* (2006.01)
*B23K 9/173* (2006.01)
*B23K 9/28* (2006.01)

(52) U.S. Cl.
CPC ............ *B23K 9/295* (2013.01); *B23K 9/1735* (2013.01); *B23K 9/285* (2013.01)

(58) Field of Classification Search
CPC ........ B23K 9/1735; B23K 9/26; B23K 9/285; B23K 9/295
(Continued)

(56) References Cited

U.S. PATENT DOCUMENTS 8,567,826 B2   10/2013   Bichler et al.
8,907,249 B2   12/2014   Berger et al.
(Continued)

FOREIGN PATENT DOCUMENTS

CN   101219500 A   7/2008
CN   101262978 A   9/2008
(Continued)

OTHER PUBLICATIONS

Japanese Office Action in JP 2021-507526, dated Apr. 5, 2022.
(Continued)

*Primary Examiner* — Dana Ross
*Assistant Examiner* — James F Sims, III
(74) *Attorney, Agent, or Firm* — Collard & Roe, P.C.

(57) ABSTRACT

A pair of two nozzle assembly receptacles for a dual-wire welding torch for two melting welding wires, has a torch body, a connection for a hose package, and a common gas nozzle, and a dual-wire welding torch has a pair of two nozzle assembly receptacles constructed as inserts for accommodating and fastening in interfaces in the torch body provided therefor, and the nozzle assembly receptacles respectively have an opening for the accommodation of a nozzle assembly in each case, which openings are arranged at an angle between 0° and 20° to one another, so that the central axes of the contact tubes or the welding wires running therein enclose this angle to one another.

11 Claims, 6 Drawing Sheets

(58) Field of Classification Search
USPC .................................................. 219/137.62
See application file for complete search history.

(56) References Cited

U.S. PATENT DOCUMENTS

| | | | |
|---|---|---|---|
| 9,862,056 B2 | 1/2018 | Berger et al. | |
| 9,925,622 B2* | 3/2018 | Kanemaru | B23K 9/1735 |
| 10,232,458 B2 | 3/2019 | Grossauer et al. | |
| 2008/0169336 A1 | 7/2008 | Spiegel et al. | |
| 2009/0236320 A1 | 9/2009 | Enatsu et al. | |
| 2012/0055911 A1 | 3/2012 | Jia et al. | |
| 2013/0270247 A1* | 10/2013 | Kachline | B23K 9/325 |
| | | | 219/137.42 |

FOREIGN PATENT DOCUMENTS

| | | |
|---|---|---|
| CN | 101712095 A | 5/2010 |
| CN | 101925433 A | 12/2010 |
| CN | 102430846 A | 5/2012 |
| CN | 105880814 A | 8/2016 |
| EP | 1 077 102 A2 | 2/2001 |
| GB | 1 450 912 A | 9/1976 |
| JP | 2001-47245 A | 2/2001 |
| JP | 2003-39172 A | 2/2003 |
| JP | 2006-289381 A | 10/2006 |
| JP | 2010-036241 A | 2/2010 |
| JP | 2013-039624 A | 2/2013 |
| WO | 2008/016084 A1 | 2/2008 |

OTHER PUBLICATIONS

International Search Report in PCT/EP2019/071545, dated Nov. 12, 2019.

European Search Report in EP 18188660.7-1016, dated Mar. 14, 2019, with English translation of relevant parts.

* cited by examiner

PAIR OF TWO NOZZLE ASSEMBLY RECEPTACLES FOR A DUAL-WIRE WELDING TORCH AND DUAL-WIRE WELDING TORCH HAVING SUCH A PAIR OF TWO NOZZLE ASSEMBLY RECEPTACLES

CROSS REFERENCE TO RELATED APPLICATIONS

This application is the National Stage of PCT/EP2019/071545 filed on Aug. 12, 2019, which claims priority under 35 U.S.C. § 119 of European Application No. 18188660.7 filed on Aug. 13, 2018, the disclosure of which is incorporated by reference. The international application under PCT article 21(2) was not published in English.

BACKGROUND OF THE INVENTION

1. Field of the Invention

The invention relates to a pair of two nozzle assembly receptacles for a dual-wire welding torch for two melting welding wires, having a torch body, having a connection for a hose package, and having a common gas nozzle, in each case for accommodating nozzle assemblies with contact tubes, which can be arranged therein, for guiding the welding wires.

Furthermore, the invention relates to a dual-wire welding torch for two melting welding wires, having a torch body, having a connection for a hose package, and having two nozzle assembly receptacles, in each case for accommodating nozzle assemblies with contact tubes, which can be arranged therein, for guiding the welding wires, and having a common gas nozzle.

The present description is focussed on a dual-wire welding torch for two melting welding wires. An extension to a three- or multi-wire welding torch is conceivable in the context of the invention.

2. Description of the Related Art

Dual- or multi-wire welding torches of this type are used for welding tasks with increased melting output, in order to achieve a higher welding travel speed and thus increased productivity. In this case, two electrically independent electric arcs burn between two welding wires, which are guided through two separate contact tubes, in a common melt pool. Due to the feeding of two welding wires, which may be made from the same or from different material and be present in the same or a different diameter, a higher volume of additive material is achieved, which is introduced into the gap between two workpieces to be welded or is applied onto the workpiece to be welded.

For example, US 2012/0055911 A1 describes a dual-wire welding torch of the type in question, which should stand out due to a particularly compact design.

Usually, the contact tubes for guiding the welding wires are arranged in a fixed manner parallel or at a predetermined angle to one another. If welding should be carried out with a different position of the contact tubes with respect to one another, a corresponding welding torch, which is designed therefor, must be used.

Various dual-wire welding torches are known from GB 1 450 912 A, US 2008/169336 A1, JP 2006 289381 A, JP 2010 036241 A, EP 1 077 102 A2 or JP 2013 039624 A, in which a change of the angle of the two welding wires to one another is not possible or is only possible with a relatively large outlay, however.

SUMMARY OF THE INVENTION

The object of the invention consists in the creation of an above-mentioned pair of two nozzle assembly receptacles and a dual-wire welding torch having such a pair of two nozzle assembly receptacles, which permit retrofitting to different alignments of the contact tubes or welding wires with respect to one another in a simple and inexpensive manner. Disadvantages of known dual-wire welding torches should be avoided or at least reduced.

The object according to the invention is achieved by means of an above-mentioned pair of nozzle assembly receptacles, wherein the nozzle assembly receptacles are constructed as inserts for accommodating and fastening in interfaces in the torch body provided therefor, and the nozzle assembly receptacles respectively have an opening for the accommodation of a nozzle assembly in each case, which openings are arranged at an angle between 0° and 20° to one another, so that the central axes of the contact tubes or the welding wires running therein enclose this angle to one another. Thus, by means of the purchase and the storage of various nozzle assembly pairs and gas dispensers possibly belonging thereto, a set of dual-wire welding torches for various welding tasks can be provided, without all components of the dual-wire welding torch having to be purchased twice or multiple times. According to the invention, only the nozzle assembly receptacles, which are constructed as an insert, are exchanged in order to be able to achieve a different angle of the contact tubes to one another or welding wires to one another. The exchange can be carried out relatively quickly and easily and the various nozzle assembly receptacle pairs with different angles of the openings can be produced very inexpensively and easily. It is no longer necessary to provide different welding torches for different angles of the contact tubes or welding wires to one another.

A channel for conveying a cooling fluid is preferably arranged in each nozzle assembly receptacle. In this manner, an optimum cooling of the nozzle assembly receptacles and the nozzle assemblies and contact tubes arranged therein can take place and the heat can be correspondingly removed.

The object according to the invention is also achieved by an above-mentioned dual-wire welding torch having an above-mentioned pair of two nozzle assembly receptacles. With regards to the advantages achievable therewith, reference is made to the above description of the pair of two nozzle assembly receptacles.

The openings of the nozzle assembly receptacles are advantageously orientated symmetrically to one another at an angle to an angle bisector. In this conventional symmetrical design of the welding torch, the nozzle assembly receptacles may be designed and produced identically and merely arranged mirror-inverted in the interfaces of the dual-wire welding torch.

According to a feature of the invention, a plurality of pairs of nozzle assembly receptacles with different angles of the openings to one another are provided, wherein the angle is preferably 0°, 4°, 8° and 11.5°. Angles of this type have proven to be particularly suitable for various welding applications.

An optimum cooling of the gas nozzle and components of the dual-wire welding torch possibly interposed may be carried out, if a connection for the feed of a cooling fluid and a connection for the drainage of the cooling fluid are arranged in the torch body, which connections are connected to one another by means of a cooling channel arranged in the gas nozzle. Cooling water or other cooling liquids may in particular be used as cooling fluid. The use of gases for cooling the dual-wire welding torch is likewise conceivable.

The nozzle assembly receptacles preferably have at least one cooling channel in each case, which can be connected to the connection for the feed of the cooling fluid and the connection for the drainage of the cooling fluid in the torch body. The nozzle assembly receptacles can also be cooled in this manner. The run of the cooling fluid may take place in such a manner that, for example, first the gas nozzle and after that the nozzle assembly receptacles are cooled. The sequence of the run of the cooling fluid may be correspondingly arbitrary or adapted to the respective use. It is important that the cooling channels are connected virtually in series one after the other. Corresponding O-rings or the like are preferably arranged for sealing the cooling channels of the nozzle assembly receptacles.

If the nozzle assemblies also have at least one cooling channel, which can be connected to the cooling channels of the nozzle assembly receptacles, the nozzle assemblies, and to a certain extent, also the contact tubes arranged therein, can also be cooled and the heat can be removed better. The cooling channels of the nozzle assemblies, nozzle assembly receptacles and the gas nozzle are connected to one another in series, as desired, wherein care is taken that cooling fluid flows through the more sensitive components of the dual-wire welding torch first.

The nozzle assembly receptacles may be fastened on the interfaces of the torch body in a simple manner by means of screws. This constitutes a simple and inexpensive design option. The correspondingly configured screws may also be opened and closed again relatively quickly for retrofitting the dual-wire welding torch to a different angle between the contact tubes or welding wires. Of course, other connection types, such as e.g. quick-lock mechanisms that can be operated without tools or the like, are also conceivable.

Advantageously, the nozzle assemblies are sealed with respect to the nozzle assembly receptacles by means of O-rings. The escape of the protective gas usually flowing through the interior of the nozzle assemblies and contact tubes can be prevented by means of O-rings of this type. The O-rings are produced from a suitable elastic material, which withstands the temperatures usually arising in a welding torch.

According to a further feature of the invention, a gas dispenser is provided with two openings for the accommodation of the nozzle assemblies and a plurality of holes for conveying a protective gas, wherein the openings for accommodating the nozzle assemblies are orientated in accordance with the angle of the openings of the nozzle assembly receptacles to one another. A gas dispenser of this type is used to dispense the protective gas optimally, so that a uniform protective gas flow results at the mouth of the gas nozzle, which protective gas flow correspondingly surrounds the electric arcs of the dual-wire welding torch. Like the pair of two nozzle assembly receptacles, a separate gas dispenser is necessary for each desired angle of the compact tubes or welding wires to one another, which gas dispenser correspondingly takes the different angles of the nozzle assemblies to one another into account.

The gas dispenser is preferably formed from a suitable temperature-resistant plastic.

If a pivotable fixing clip is provided on the torch body for fastening the gas nozzle without tools, the gas nozzle can be removed from the torch body particularly easily and quickly, in order to easily be able to replace the components lying therebehind, such as e.g. the nozzle assembly receptacles, nozzle assemblies, compact tubes and the gas dispenser. In the locked position, the fixing clip should correspondingly latch in, in order to be able to prevent an undesired detachment of the gas nozzle from the torch body.

The gas nozzle may be constructed in two pieces and have a gas nozzle base body and a gas nozzle mouthpiece connected thereto in a detachable manner. In this manner, the part of the gas nozzle facing the electric arcs, the gas nozzle mouthpiece, which is subject to a relatively high wear, can be exchanged more often, whereas the gas nozzle base body may be used for longer. Furthermore, due to the two-piece construction of the gas nozzle, it is possible to produce the individual parts from different material. The cooling of the gas nozzle may take place by means of a corresponding cooling channel in such a manner that the cooling channel is arranged in the separation plane between gas nozzle base body and gas nozzle mouthpiece and both parts can be cooled in the case of a correspondingly assembled gas nozzle.

In this case, the gas nozzle mouthpiece is preferably connected to the gas nozzle base body in a detachable manner by means of a wire clip. Due to this measure, a quick and simple exchange of the gas nozzle mouthpiece, which usually wears more quickly, can be carried out.

The end of the torch body facing the gas nozzle has a substantially rectangular cross section and the end of the torch body facing the connection for the hose package has a substantially round cross section. This design of the torch body is advantageous with regards to the operation of the dual-wire welding torch. The rectangular cross section of the free end of the dual-wire welding torch may be arranged to be transverse or upright, depending on the design of the dual-wire welding torch, so that the two contact tubes are arranged either next to one another or one behind the other during welding. In this manner, either wide weld seams may be formed for bridging wide gaps between workpieces or narrower and deeper welding wires may be formed.

The torch body may for example be formed from epoxy resin. This material has proven particularly suitable for producing welding torches and has a satisfactory temperature resistance. Of course, other insulating materials are also possible.

BRIEF DESCRIPTION OF THE DRAWINGS

The invention is explained in more detail on the basis of the attached drawings. In the figures

DETAILED DESCRIPTION OF THE PREFERRED EMBODIMENTS

Figure 1:
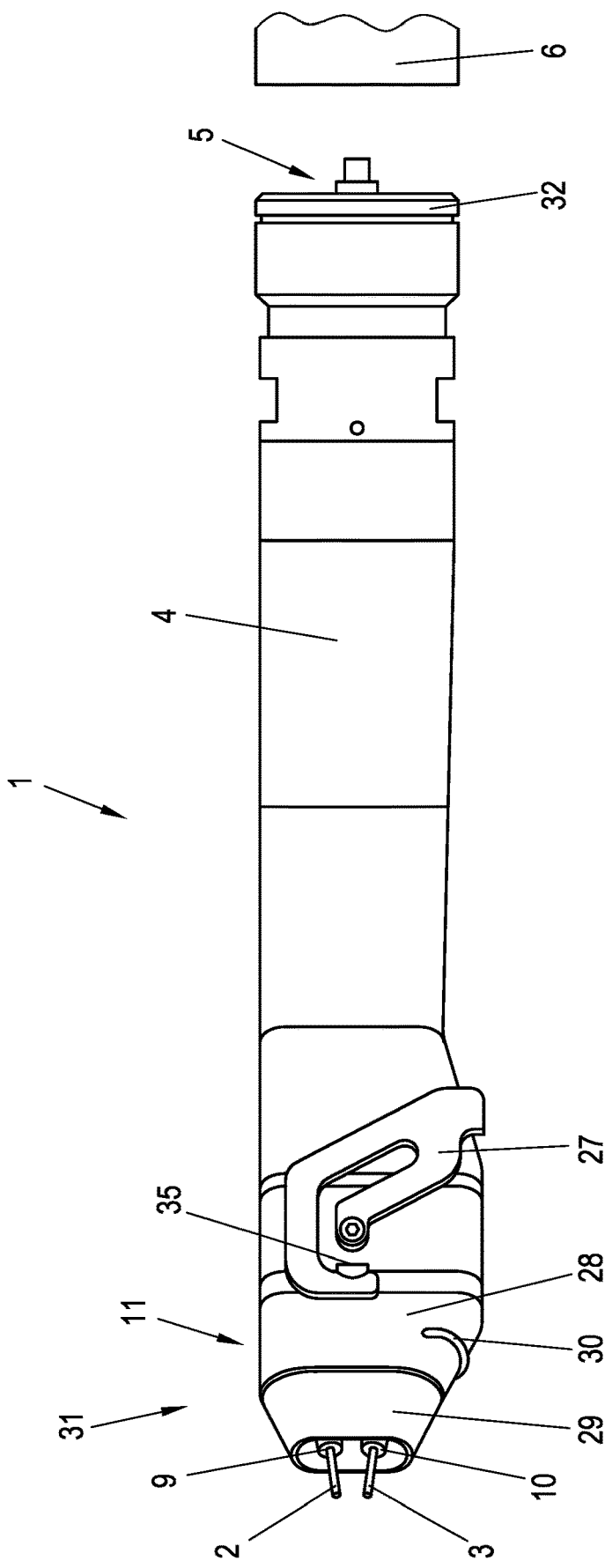
FIG. 1 shows a view onto an embodiment of a dual-wire welding torch according to the present invention.

An embodiment of a dual-wire welding torch 1 according to the present invention is illustrated in FIG. 1. The dual-wire welding torch 1 comprises a torch body 4 with a connection 5 for a hose package 6, which contains the corresponding electric supply lines for the welding wires 2, 3 and the protective gas and possible control lines (not illustrated). The connection between the connection 5 for the end 32 of the torch body 4 facing the hose package 6 and the hose package 6 usually takes place by means of a corresponding plug connection, which can be connected and detached again particularly quickly and easily. The dual-wire welding torch 1 has a gas nozzle 11 at the other end 31, which can be fastened to the torch body 4 by means of a pivotable fixing clip 27. The dual-wire welding torch 1 contains two compact tubes 9, 10 for guiding two welding wires 2, 3. Welds can be produced with a higher melting output with the aid of such a dual-wire welding torch 1. In the exemplary embodiment illustrated, the gas nozzle 11 is constructed in two pieces and consists of a gas nozzle base body 28 and a gas nozzle mouthpiece 29, which are connected to one another by means of a wire clip 30.

Figure 2:
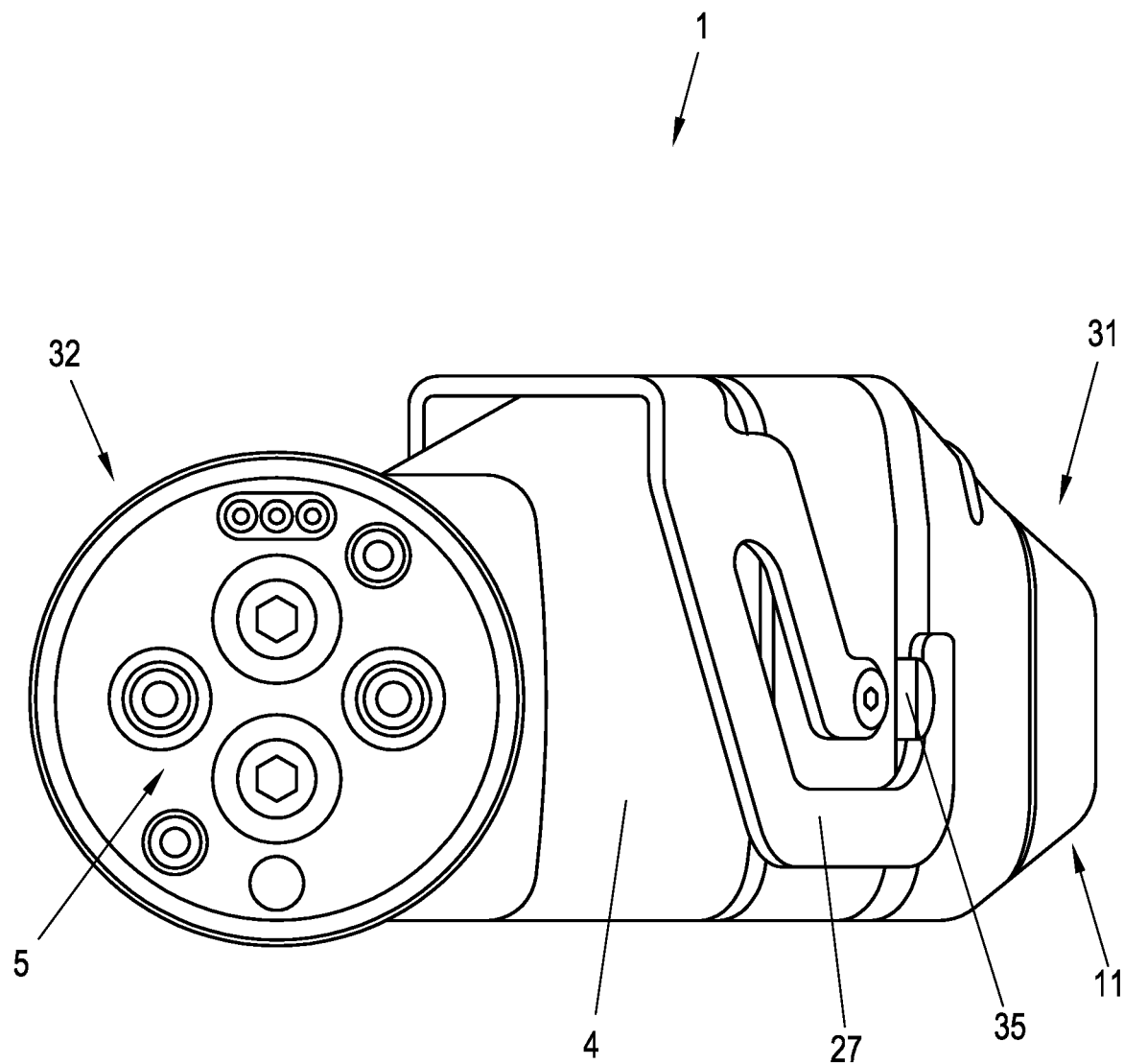
FIG. 2 shows a view onto the end of the dual-wire welding torch according to FIG. 1 designed for connection to a corresponding hose package.

FIG. 2 shows a view onto the end 32 of the dual-wire welding torch 1 according to FIG. 1 designed for connection to a corresponding hose package 6. In this view of the dual-wire welding torch, one can see the end 32 of the dual-wire welding torch 1 constructed to be substantially round and the connection 5 for connection to a hose package 6 (cf. FIG. 1). The connection 5 contains the electric connections for transmitting the welding current to the contact tubes 9, 10 carrying the welding wires 2, 3, supply lines and discharge lines for a cooling fluid, control lines and connections for transferring a protective gas.

Figure 3:
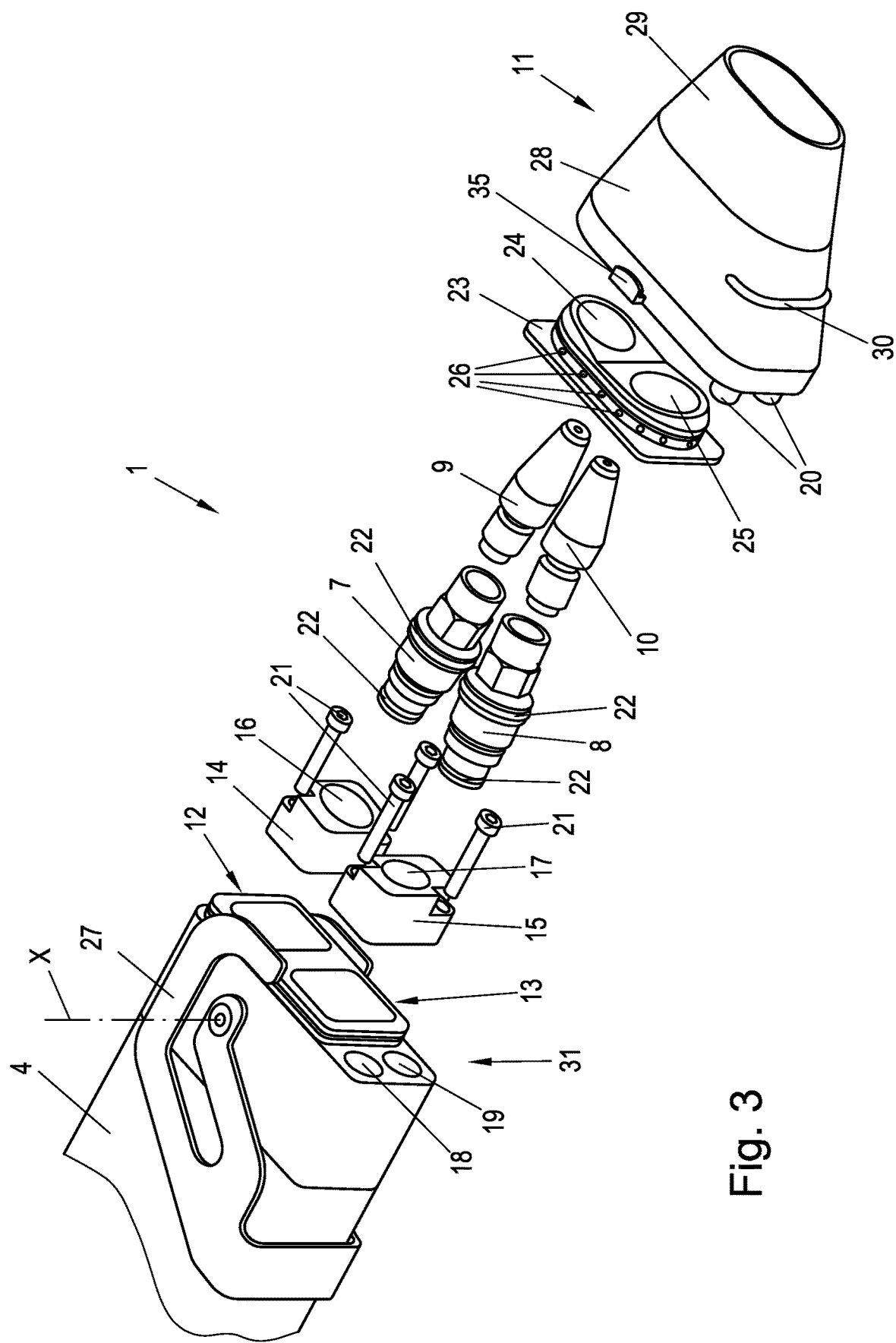
FIG. 3 shows an exploded illustration of the dual-wire welding torch according to FIG. 1.

The individual components can be seen better from the exploded illustration of the dual-wire welding torch 1 according to FIG. 3. In this illustration, the important components of the dual-wire welding torch 1 in question can be seen. Accordingly, at the end 31 facing the gas nozzle, which end preferably has a rectangular cross section, the torch body 4 has two interfaces 12, 13 for accommodating two nozzle assembly receptacles 14, 15, which nozzle assembly receptacles are constructed to be replaceable as inserts. The nozzle assembly receptacles 14, 15 can for example be connected to the interfaces 12 or 13 by means of screws 21. The nozzle assembly receptacles 14, 15 respectively have an opening 16, 17 for the accommodation of a nozzle assembly 7, 8, which openings 16, 17 are arranged at an angle $\alpha$ to one another of between 0 and 20°. If the nozzle assemblies 7, 8 and the contact tubes 9, 10 which can be connected thereto are arranged in the corresponding openings 16, 17 of the nozzle assembly receptacles 14, 15, then the central axes a, b of the contact tubes 9, 10 or the welding wires 2, 3 running therein enclose this angle $\alpha$ (cf. FIG. 4). Although asymmetric designs are conceivable, in which the angles of the openings 16, 17 of the two nozzle assembly receptacles 14, 15 can be constructed differently, a symmetrical arrangement, in which the openings 16, of both nozzle assembly receptacles 14, 15 are orientated symmetrically to an angle bisector, is conventional. As a result, the nozzle assembly receptacles 14, 15 can theoretically be produced identically and merely arranged mirror-inverted to the interfaces 12 and 13. In the symmetrical arrangement, both openings 16, 17 of the nozzle assembly receptacles 14, 15 have half the angle $\alpha/2$ to the angle bisector.

Thus, by means of the mere exchange of a pair of nozzle assembly receptacles 14, 15, a novel dual-wire welding torch 1 can be created, with a different angle $\alpha$ of the central axes of the contact tubes 9, 10 or the welding wires 2, 3 running therein to one another. Conventional angles are 0°, 4°, 8° and 11.5°.

Preferably, both a connection 18 for the feed of a cooling fluid and a connection 19 for the drainage of the cooling fluid are arranged at the end 31 of the torch body 4, which preferably has a rectangular cross section. The connections 18, 19 are in this case substantially above one another and to the side of the interfaces 12, 13. The end 31 of the torch body with a preferably rectangular cross section therefore has the two interfaces 12, 13 and a region for the connections 18, 19 of the cooling fluid. A cooling channel 20 arranged in the gas nozzle 11 is supplied with the cooling fluid by means of the connections 18, 19 and correspondingly connected to one another in a detachable manner. To this end, the connections 18, 19 have corresponding seals and/or what is known as a fluid stopper (not illustrated), so that when the connection is detached, that is to say when the gas nozzle 11 is removed from the torch body 4, an escape of the cooling fluid is prevented. An optimum cooling of the gas nozzle 11 may take place in this manner. If, in addition, the nozzle assembly receptacles 14, 15 and possibly the nozzle assemblies 7, 8 have cooling channels 33, 34, these components can also be cooled optimally (cf. FIG. 5 to this end).

As already mentioned previously, the gas nozzle 11 can be constructed in two pieces and comprise a gas nozzle mouthpiece 29 and a gas nozzle base body 28, which can be connected to one another in a detachable manner by means of a wire clip 30. In this manner, the quicker wearing gas nozzle mouthpiece 29 can be replaced separately from the gas nozzle base body 28. The gas nozzle 11 is preferably connected to the torch body 4 without tools by means of a pivotable fixing clip 27. The fixing clip 27 is in this case fastened to the end 31 of the torch body with the preferably rectangular cross section in such a manner that it can be pivoted about the rotational axis X. For fixing, the gas nozzle 11 has corresponding projections 35 on both sides, which correspondingly hold or enclose the fixing clip 27 in the fixed position.

To achieve the desired seal tightness both for the flowing protective gas and the possible cooling fluid, O-rings 22 are arranged on various components, particularly the nozzle assemblies 7, 8.

For the optimum dispersion of a protective gas, a gas dispenser 23 with two openings 24, 25 for accommodating the nozzle assemblies 7, 8 may be provided. The gas dispenser 23, which is preferably formed from a suitable temperature-resistant plastic material, has corresponding holes 26 for the dispersion of the protective gas. The two openings 24, 25 are orientated at an angle $\alpha$ to one another in accordance with the nozzle assembly receptacles 14, 15. Thus, when using a gas dispenser 23, this can also be provided and, if appropriate, fastened for various angles $\alpha$.

Figure 4:
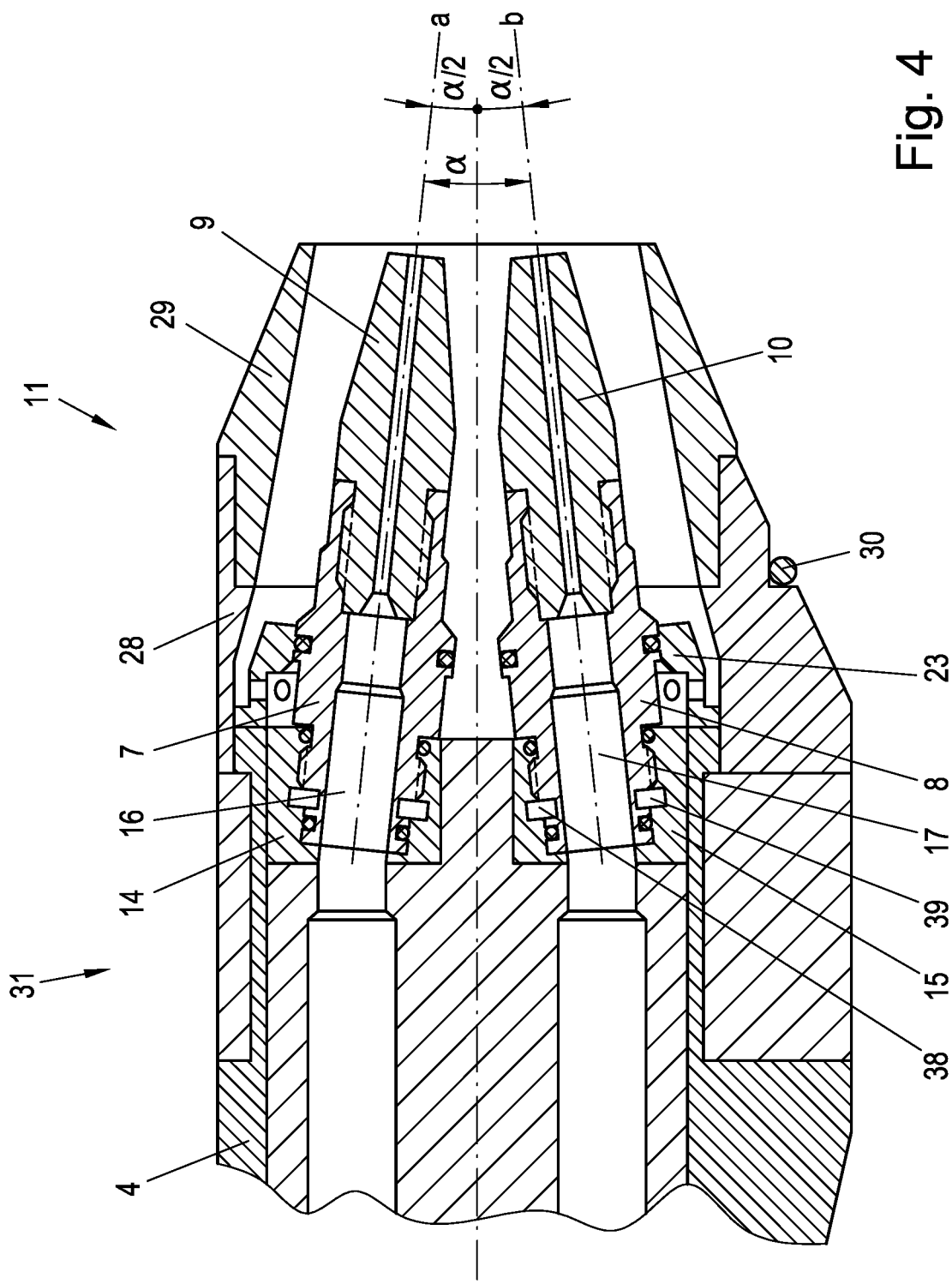
FIG. 4 shows a sectional image through a part of the front end of the dual-wire welding torch according to FIG. 1.

FIG. 4 shows a sectional image through a part of the front end 31 of the dual-wire welding torch 1. In this cutaway illustration of the end of the dual-wire welding torch 1, the openings 16, 17 in the nozzle assembly receptacles 14, 15, which are arranged at an angle, can correspondingly be seen.

Figure 5:
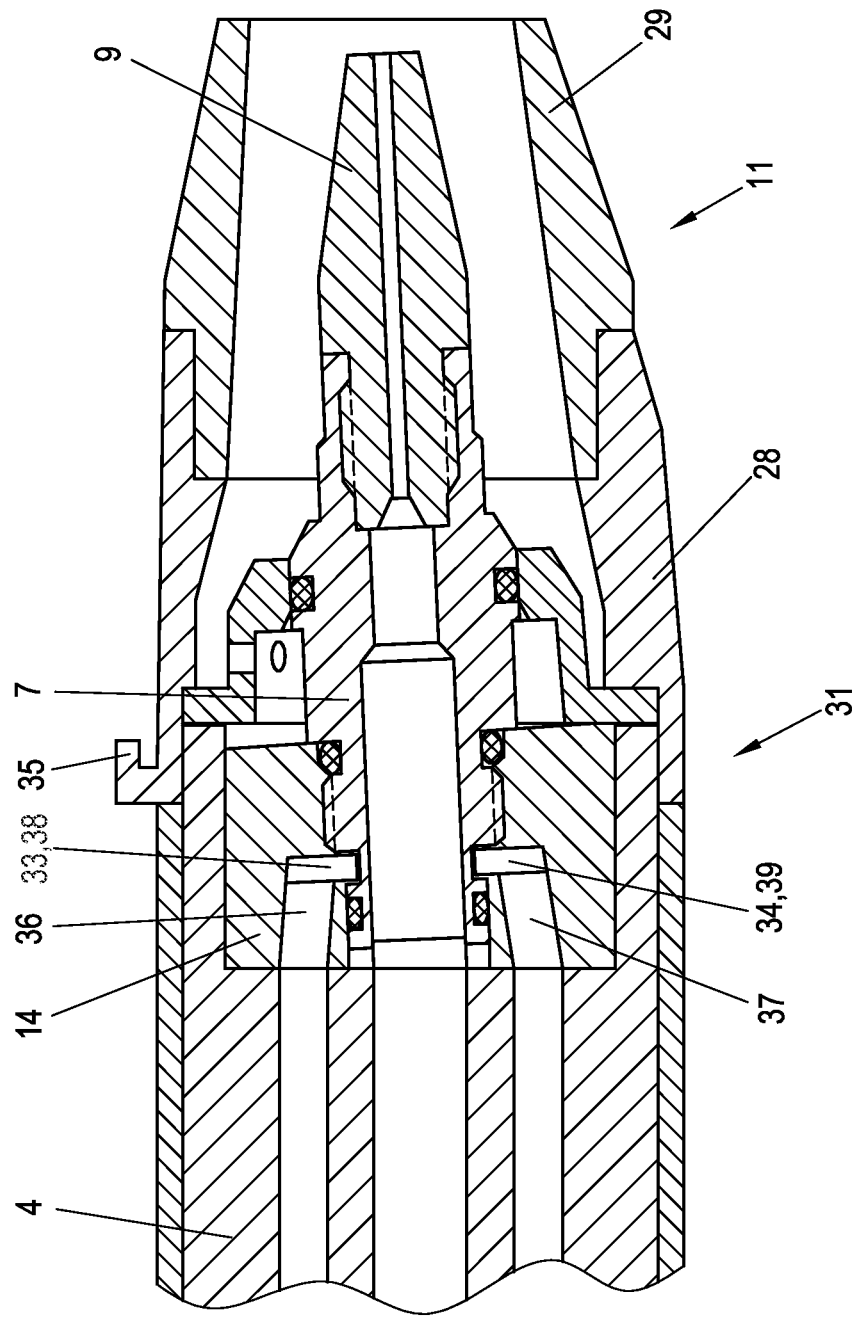
FIG. 5 shows a sectional image of the front end of the dual-wire welding torch.
Figure 6A:
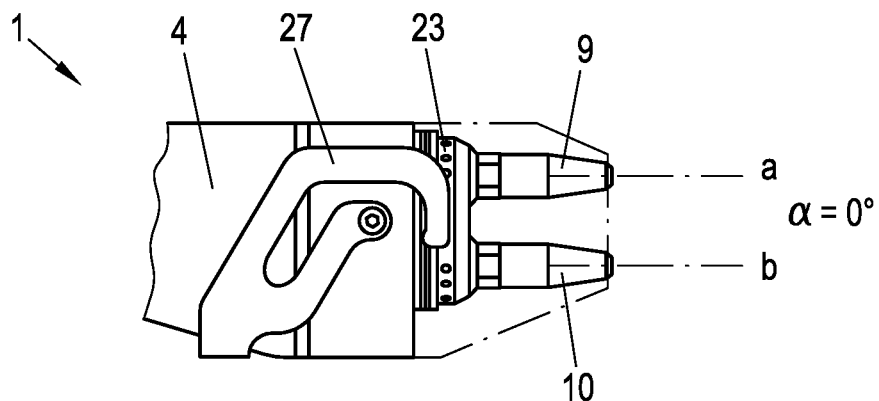
FIGS. 6a to 6D show various embodiments of the nozzle assembly receptacles and gas dispensers according to the invention of a dual-wire welding torch according to FIG. 1.
Figure 6B:
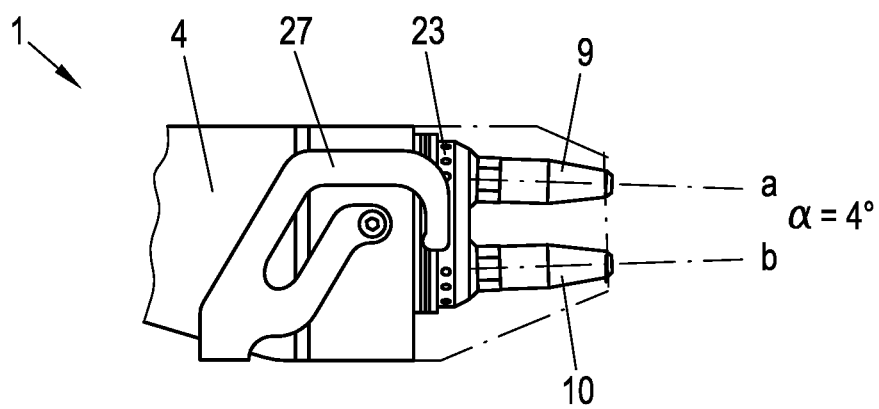
Figure 6C:
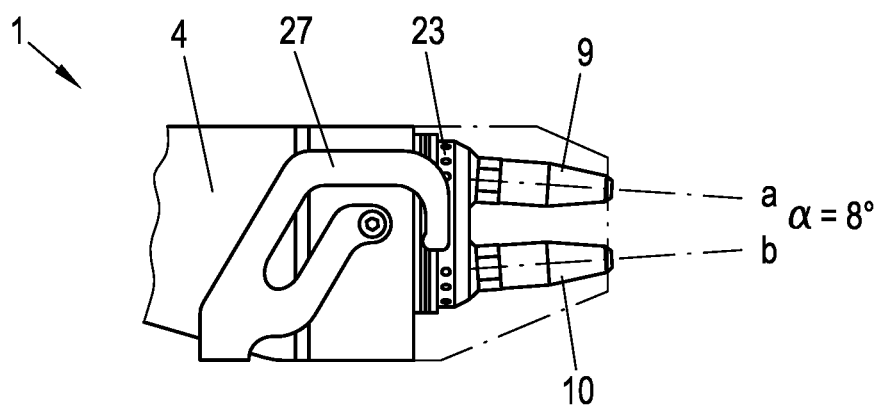
Figure 6D:
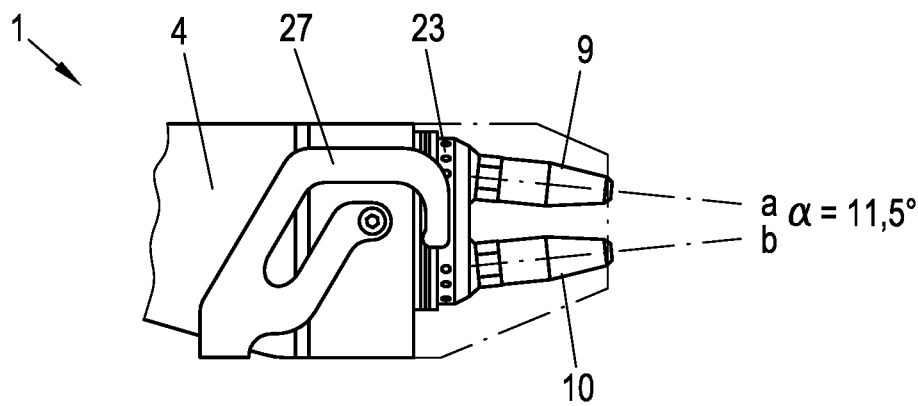

FIG. 5 shows a sectional image of the front end 31 of the dual-wire welding torch 1. In this sectional image, one can see a possible cooling channel 33 in the nozzle assembly receptacle 14 and a possible cooling channel 34 in the nozzle assembly 7. According to a preferred design variant, the cooling channel 33 in the nozzle assembly receptacle 14 has a feed 36 and a return 37, which are preferably arranged oppositely and essentially constructed as a bore. The feed 36 and the return 37 are connected to one another by means of a circumferential channel 38 in the opening 16 of the nozzle assembly receptacle 14. The nozzle assembly 7, which is arranged in the opening 16 of the nozzle assembly receptacle 14, has a groove 39 corresponding to this circumferential channel 38 for conveying the cooling fluid, which groove 39 forms the cooling channel 34 in the nozzle assembly 7. The nozzle assembly receptacle 15 and the nozzle assembly 8 are built identically. The cooling fluid runs for example from the connection 18 through the cooling channel 20 in the gas nozzle 11, subsequently through the cooling channel 33 in the nozzle assembly receptacle 15 and the nozzle assembly 8 and thereafter through the cooling channel 33 in the nozzle assembly receptacle 14 and the nozzle assembly 7, before the cooling fluid is returned via the connection 19 at the end of the torch body 4. Therefore, it is possible to speak here of cooling in series, wherein preferably the hottest component is cooled first and after that the further components are cooled. In many cases, the hottest component is the nozzle assembly receptacle at the front as viewed in the welding direction. Depending on the use, the gas nozzle 11 may of course also be the hottest component.

FIGS. 6A to 6D show various embodiments of the nozzle assembly receptacles 14, 15 and gas dispenser 23 according to the invention for various angles α of the openings 16, 17 of the nozzle assembly receptacles 14, 15 to one another. Various designs of the dual-wire welding torch 1 are illustrated here. In the variant according to FIG. 6A, the nozzle assembly receptacles 14, 15 and the gas dispenser 23 are configured in such a manner that the two contact tubes 9, 10 are arranged parallel to one another, that is to say enclose an angle of 0°. In the variant according to FIG. 6B, the contact tubes 9, 10 or the welding wires 2, 3 running therein enclose an angle of 4°. In the version according to FIG. 6C, the contact tubes 9, 10 enclose an angle of α=8°, in the variant according to FIG. 6D an angle of α=11.5°. However, by means of corresponding production and shaping of the nozzle assembly receptacles 14, 15 and the possible gas dispenser 23, further angles may also be realized, which could be advantageous for certain welding methods, which are executed using the welding torch 1.

The invention claimed is:

1. An assembly comprising a dual-wire welding torch for first and second melting welding wires and a set of a plurality of pairs of first and second nozzle assembly receptacles, the dual-wire welding torch comprising:
    a torch body with a connection for a hose package,
    a first pair of first and second nozzle assembly receptacles selected from the set of a plurality of pairs of first and second nozzle assembly receptacles for accommodating first and second nozzle assemblies with first and second contact tubes, arranged in the first and second nozzle assembly receptacles, for guiding the first and second melting welding wires,
    a common gas nozzle,
    a connection for a feed of a cooling fluid arranged in the torch body, and
    a connection for drainage of the cooling fluid arranged in the torch body,
    wherein the torch body has first and second interfaces for accommodating and fastening the pair of first and second nozzle assembly receptacles,
    wherein the first and second nozzle assembly receptacles of each pair of first and second nozzle assembly receptacles are constructed as inserts,
    wherein each of the first nozzle assembly receptacles comprises:
        a first opening for accommodating the first nozzle assembly, and
        a first cooling channel,
    wherein each of the second nozzle assembly receptacles comprises:
        a second opening for accommodating the second nozzle assembly, and
        a second cooling channel,
    wherein the first and second openings are arranged at a selected angle between 0° and 20° to one another, so that central axes of the contact tubes or the first and second melting welding wires extending respectively through the contact tubes are aligned at the selected angle to one another, wherein each pair of first and second nozzle assembly receptacles is provided with different angles of the first and second openings to one another, so that a substitution of only a second pair of first and second nozzle assembly receptacles, selected from the set of a plurality of pairs of first and second nozzle assembly receptacles for the first pair of first and second nozzle assembly receptacles changes the angle of the contact tubes to one another, and
    wherein the first cooling channel in the first nozzle assembly receptacle, the second cooling channel in the second nozzle assembly receptacle, the connection for the feed of the cooling fluid, and the connection for the drainage of the cooling fluid are connected to one another by a cooling channel arranged in the gas nozzle.

2. The assembly according to claim 1, wherein the first and second openings of the first and second nozzle assembly receptacles are orientated symmetrically to an angle bisector at the selected angle to one another.

3. The assembly according to claim 1,
    wherein the set of a plurality of pairs of first and second nozzle assembly receptacles comprises the first and second pairs of first and second nozzle assembly receptacles and third and fourth pairs of first and second nozzle assembly receptacles provided with different angles of the first and second openings to one another,
    wherein the selected angle of the first pair of first and second nozzle assembly receptacles is 0°,
    wherein the selected angle of the second pair of first and second nozzle assembly receptacles is 4°,
    wherein the selected angle of the third pair of first and second nozzle assembly receptacles is 8°, and
    wherein the selected angle of the fourth pair of first and second nozzle assembly receptacles is 11.5°.

4. The assembly according to claim 1, wherein the first and second nozzle assemblies also have first and second cooling channels, respectively, wherein the first cooling channel of the first nozzle assembly is configured to be connected to the first cooling channel of the first nozzle assembly receptacle and the second cooling channel of the second nozzle assembly is configured to be connected to the second cooling channel of the second nozzle assembly receptacle.

5. The assembly according to claim 1, further comprising screws configured to fasten the first and second nozzle assembly receptacles on the first and second interfaces.

6. The assembly according to claim 1, wherein the first and second nozzle assemblies are sealed with respect to the first and second nozzle assembly receptacles by O-rings.

7. The assembly according to claim 1, further comprising a gas dispenser provided with two openings for accommodating the first and second nozzle assemblies and a plurality of holes for conveying a protective gas, wherein the openings for accommodating the first and second nozzle assemblies are orientated in accordance with the selected angle of the openings of the first and second nozzle assembly receptacles to one another.

8. The assembly according to claim 1, wherein a pivotable fixing clip is provided on the torch body for fastening the gas nozzle without tools.

9. The assembly according to claim 1, wherein the gas nozzle has a gas nozzle base body and a gas nozzle mouthpiece connected thereto in a detachable manner.

10. The assembly according to claim 9, wherein the gas nozzle mouthpiece is connected to the gas nozzle base body in a detachable manner by a wire clip.

11. The assembly according to claim 1, wherein the end of the torch body facing the gas nozzle has a substantially rectangular cross section and the end of the torch body facing the connection for the hose package has a substantially round cross section.

\* \* \* \* \*